(12) United States Patent
Tanasa et al.

(10) Patent No.: US 10,085,114 B2
(45) Date of Patent: *Sep. 25, 2018

(54) SYSTEM AND METHOD FOR USING MULTIPLE NETWORKS TO ESTIMATE A LOCATION OF A MOBILE COMMUNICATION TERMINAL

(71) Applicant: Verint Systems Ltd., Herzliya, Pituach (IL)

(72) Inventors: Constantin Tanasa, Limassol (CY); Slobodan Ninkov, Limassol (CY)

(73) Assignee: Verint Systems Ltd., Herzliya Pituach (IL)

( * ) Notice: Subject to any disclaimer, the term of this patent is extended or adjusted under 35 U.S.C. 154(b) by 0 days.

This patent is subject to a terminal disclaimer.

(21) Appl. No.: 15/638,581

(22) Filed: Jun. 30, 2017

(65) Prior Publication Data

US 2017/0366929 A1  Dec. 21, 2017

Related U.S. Application Data

(63) Continuation of application No. 14/835,210, filed on Aug. 25, 2015, now Pat. No. 9,743,231.

(51) Int. Cl.
*H04W 24/00* (2009.01)
*H04W 4/02* (2018.01)
(Continued)

(52) U.S. Cl.
CPC ............. *H04W 4/02* (2013.01); *H04W 24/02* (2013.01); *H04W 64/00* (2013.01); *H04W 88/06* (2013.01); *H04W 88/08* (2013.01)

(58) Field of Classification Search
CPC ....... H04W 4/02; H04W 24/02; H04W 64/00; H04W 88/06; H04W 88/08
(Continued)

(56) References Cited

U.S. PATENT DOCUMENTS

2004/0058652 A1* 3/2004 McGregor ............ H04W 24/00
455/67.13
2005/0090266 A1 4/2005 Sheynblat et al.
(Continued)

FOREIGN PATENT DOCUMENTS

WO 2010/116292 10/2010

OTHER PUBLICATIONS

3GPP TS 24.008 v3.8.0, "3rd Generation Partnership Project; Technical Specification Group Core Network; Mobile radio interface layer 3 specification; Core Network Protocols—Stage 3," Release 1999, (Jun. 2001), 442 pages.
(Continued)

*Primary Examiner* — Nathan Taylor
(74) *Attorney, Agent, or Firm* — Meunier Carlin & Curfman

(57) ABSTRACT

Apparatus and methods are described, including an interrogation device comprising an antenna, a transmitter-receiver (transceiver), and a processor. The processor, via the transceiver and the antenna, solicits a mobile communication terminal to associate with the interrogation device. While the solicited terminal is associated with the interrogation device, by communicating to the terminal respective identifiers of a plurality of base stations that collectively belong to a plurality of mobile communication networks, the processor drives the terminal to receive respective signals from at least some of the base stations, and communicate a property of at least some of the received signals to the processor. Other embodiments are also described.

16 Claims, 2 Drawing Sheets

(51) Int. Cl.
*H04W 24/08* (2009.01)
*H04W 64/00* (2009.01)
*H04W 24/02* (2009.01)
*H04W 88/06* (2009.01)
*H04W 88/08* (2009.01)

(58) Field of Classification Search
USPC .......................................... 455/456.1–456.5
See application file for complete search history.

(56) References Cited

U.S. PATENT DOCUMENTS

| | | | |
|---|---|---|---|
| 2008/0220749 A1 | 9/2008 | Pridmore et al. | |
| 2010/0035630 A1 | 2/2010 | Bosnjakovic et al. | |
| 2010/0273504 A1 | 10/2010 | Bull et al. | |
| 2011/0222403 A1* | 9/2011 | Suh | H04L 41/5009 370/231 |
| 2011/0312312 A1* | 12/2011 | Astrom | G01S 5/021 455/418 |
| 2012/0032854 A1 | 2/2012 | Bull et al. | |
| 2012/0108262 A1 | 5/2012 | Nelkenbaum | |
| 2013/0342346 A1 | 12/2013 | Hazzani | |
| 2014/0362713 A1* | 12/2014 | Agarwal | H04W 24/08 370/252 |
| 2016/0127931 A1 | 5/2016 | Baxley et al. | |

OTHER PUBLICATIONS

Asokan, N., et al., "Man-in-the-Middle in Tunneled Authentication Protocols," Draft version 1.3 (latest public version: http://eprint.iacr.org/2002/163/, Nov. 11, 2002, 15 pages.

"Cell Scanning and Catcher Detection in unnoticeable pocket size," NetHawk C2, Data sheet, version 1.4, EXFO, 2010, 4 pages.

Girardin, F., et al., "Detecting air travel to survey passengers on a worldwide scale," Journal of Location Based Services, 2010, 26 pages.

Meyer, U., et al., "On the Impact of GSM Encryption and Man-in-the-Middle Attacks on the Security of Interoperating GSM/UMTS Networks," proceedings of the 15th IEEE International Symposium on Personal, Indoor and Mobile Radio Communications, 2004, pp. 2876-2883.

Strobel, D., "IMSI Catcher," Seminararbeit, Ruhr-Universität Bochum, 2007, pp. 13-24.

Vedaldi, A., "An implementation of SIFT detector and descriptor," University of California at Los Angeles, 2007, 7 pages.

* cited by examiner

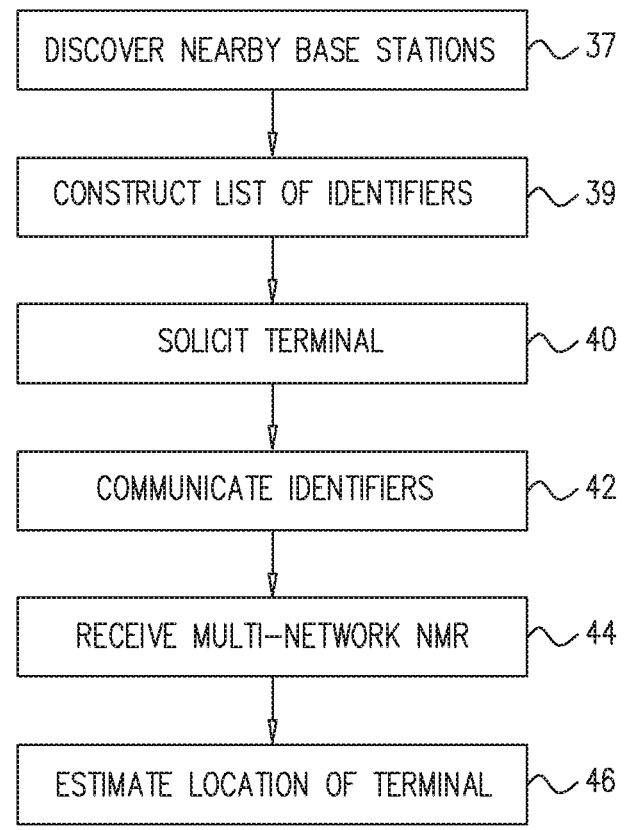

SYSTEM AND METHOD FOR USING MULTIPLE NETWORKS TO ESTIMATE A LOCATION OF A MOBILE COMMUNICATION TERMINAL

CROSS-REFERENCE TO RELATED APPLICATION

The present application is a Continuation of U.S. patent application Ser. No. 14/835,210, which was filed on Aug. 25, 2015, and which is hereby incorporated by reference in its entirety.

FIELD OF THE DISCLOSURE

The present disclosure relates generally to mobile communication, and specifically to estimating the location of a mobile communication terminal.

BACKGROUND OF THE DISCLOSURE

In some cases, law-enforcement or security personnel may wish to track a particular subject.

SUMMARY OF THE DISCLOSURE

There is provided, in accordance with some embodiments of the present invention, an interrogation device that includes an antenna, a transmitter-receiver (transceiver), and a processor. The processor is configured to, via the transceiver and the antenna, solicit a mobile communication terminal to associate with the interrogation device. While the solicited terminal is associated with the interrogation device, by communicating to the terminal respective identifiers of a plurality of base stations that collectively belong to a plurality of mobile communication networks, the processor drives the terminal to (i) receive respective signals from at least some of the base stations, and (ii) communicate a property of at least some of the received signals to the processor.

In some embodiments, the processor is further configured to, via the transceiver and the antenna, prior to communicating the identifiers, discover the base stations, by detecting signals from the base stations.

In some embodiments, the property of the at least some of the received signals includes an indication of respective strengths of the at least some of the received signals, the processor being configured to drive the terminal to communicate the indication to the processor.

In some embodiments, the processor is further configured to estimate a location of the terminal, based on the property of the received signals.

There is further provided, in accordance with some embodiments of the present invention, a method that includes soliciting a mobile communication terminal to associate with an interrogation device. While the solicited terminal is associated with the interrogation device, respective identifiers of a plurality of base stations that collectively belong to a plurality of mobile communication networks are communicated to the terminal from the interrogation device, so as to drive the terminal to (i) receive respective signals from at least some of the base stations, and (ii) communicate a property of at least some of the received signals to the interrogation device.

In some embodiments, the method further includes, prior to communicating the identifiers, discovering the base stations, by detecting signals from the base stations.

In some embodiments, the property of the at least some of the received signals includes an indication of respective strengths of the at least some of the received signals, the method including driving the terminal to communicate the indication to the interrogation device.

In some embodiments, the method further includes estimating a location of the terminal, based on the property of the received signals.

There is further provided, in accordance with some embodiments of the present invention, a computer software product including a tangible non-transitory computer-readable medium in which program instructions are stored. The instructions, when read by a processor of an interrogation device, cause the processor to, via an antenna and a transmitter-receiver (transceiver) of the interrogation device, (a) solicit a mobile communication terminal to associate with the interrogation device, and (b) while the solicited terminal is associated with the interrogation device, by communicating to the terminal respective identifiers of a plurality of base stations that collectively belong to a plurality of mobile communication networks, drive the terminal to (i) receive respective signals from at least some of the base stations, and (ii) communicate a property of at least some of the received signals to the processor.

In some embodiments, the instructions further cause the processor to, via the transceiver and the antenna, prior to communicating the identifiers, discover the base stations, by detecting signals from the base stations.

In some embodiments, the property of the at least some of the received signals includes an indication of respective strengths of the at least some of the received signals, the instructions causing the processor to drive the terminal to communicate the indication to the processor.

In some embodiments, the instructions further cause the processor to estimate a location of the terminal, based on the property of the received signals.

The present disclosure will be more fully understood from the following detailed description of the embodiments thereof, taken together with the drawings in which:

BRIEF DESCRIPTION OF THE DRAWINGS

FIG. 2 is a flow diagram for a method for estimating the location of a mobile phone, in accordance with some embodiments described herein.

DETAILED DESCRIPTION OF EMBODIMENTS

Overview

Figure 1:
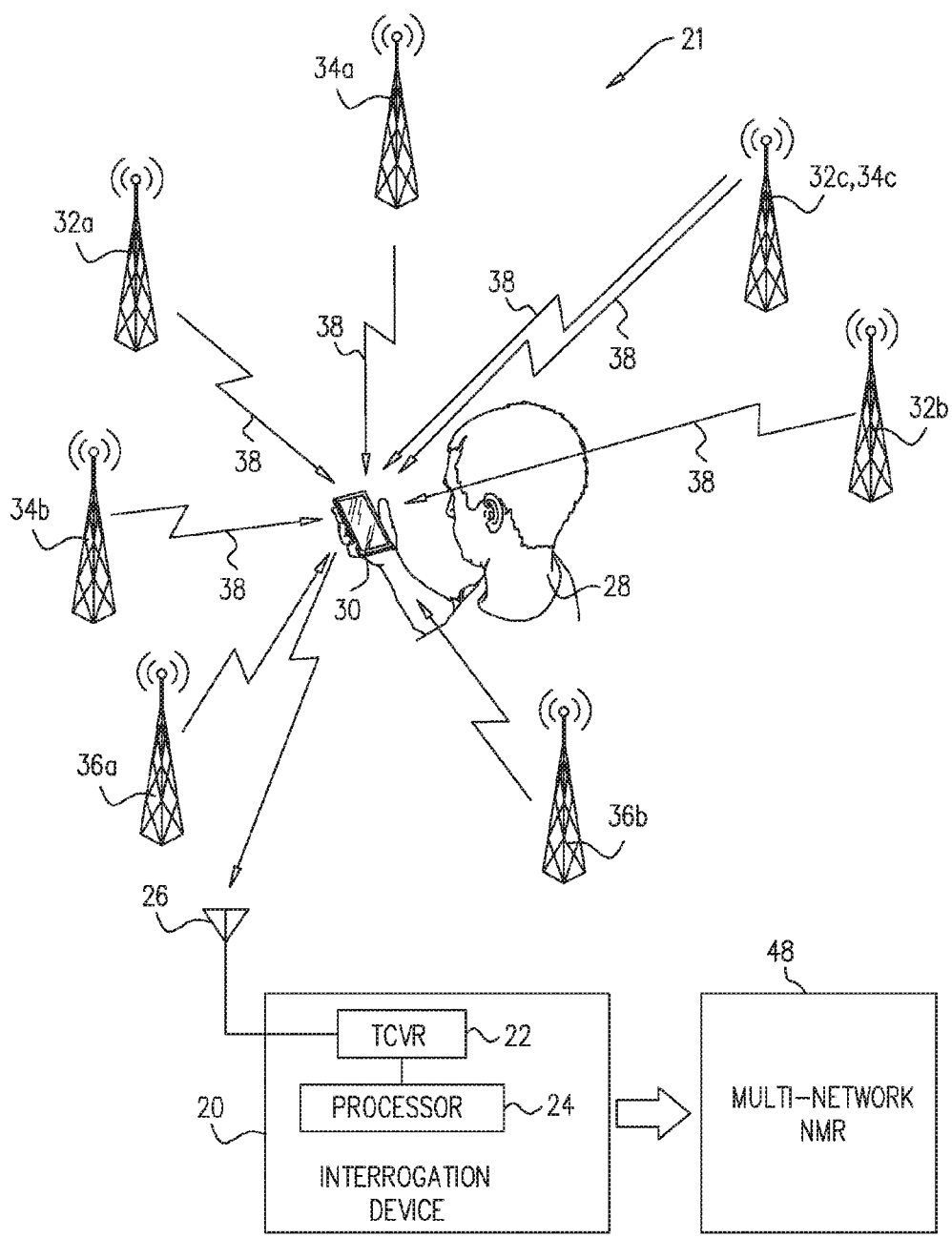
FIG. 1 is a schematic illustration of a system for estimating the location of a mobile phone, in accordance with some embodiments described herein.

In some cases, law-enforcement or security personnel may wish to track a particular subject. Estimating the location of the subject's mobile communication terminal may facilitate such tracking.

The term "mobile communication terminal," as used in the claims and specification of the present application, refers to a mobile phone (such as a smartphone), tablet computer, or any other wireless-enabled device. Thus, although, for simplicity, the present description generally uses the term "phone" or "mobile phone," it is noted that embodiments described herein may be used to estimate the location of any suitable type of mobile communication terminal.

A mobile phone is normally associated at a given time with a particular mobile communication network, to which belong a plurality of base stations. Typically, each of the base stations in the network continually (e.g., periodically) transmits a reference signal on particular resources (e.g., times, frequencies and/or codes) on which no other base station in the network transmits a reference signal.

At any time, the phone may communicate (e.g., with another phone) via one of the base stations, referred to as the serving base station. Upon beginning to communicate via a particular serving base station, the phone typically receives, from the serving base station, a plurality of identifiers (e.g., Cell IDs) of other nearby base stations belonging to the network. In response to receiving the identifiers, the phone receives respective reference signals from at least some of the other base stations, by briefly tuning to the resources (e.g., times, frequencies and/or codes) used by those base stations.

In response to the received reference signals, the phone may communicate a network measurement report (NMR) to the serving base station, the NMR including respective signal strengths of at least some of the received reference signals. Typically, the NMR includes the "top N" (i.e., highest N) signal strengths, N being a positive integer such as six, for example. In response to the NMR, the serving base station may hand the phone off to one of the other base stations, e.g., the base station corresponding to the highest signal strength, such that the other base station "takes over" as the serving base station.

An NMR may be used to estimate the location of a phone, in that the signal strengths included in the NMR are indicative of the location of the phone. For example, the signal strengths included in the NMR may be mapped to a coordinate by applying a computational model, and/or by utilizing data obtained from drive testing.

The inventors have realized that it may be advantageous to estimate the location of a phone by utilizing base stations that collectively belong to more than one network. For example, the estimate may be based on a "multi-network NMR," as further described hereinbelow. By utilizing base stations that collectively belong to more than one network, and hence, often collectively have a more diverse geographical distribution than the set of base stations belonging to only one network, the top N signal strengths may be higher, relative to a single-network NMR. Since the accuracy and/or precision of the location estimate generally increases as the top N signal strengths increase, the location estimate may be improved by utilizing a multi-network NMR.

For example, in a single-network NMR, the phone may include as one of the top N signal strengths a relatively low signal strength, corresponding to an in-network base station that is relatively far from the phone, for lack of a higher signal strength. On the other hand, in generating a multi-network NMR, the phone is not "forced" to use the relatively far in-network base station; rather, the phone may use a closer out-of-network base station.

Accordingly, embodiments described herein include an interrogation device that solicits a mobile phone to associate with the interrogation device. While the solicited phone is associated with the interrogation device, the interrogation device communicates respective identifiers of a plurality of base stations to the phone, the base stations collectively belonging to at least two different mobile communication networks. By communicating the identifiers to the phone, the interrogation device drives the phone to receive respective reference signals from at least some of the base stations, and communicate a property of at least some of the received reference signals to the interrogation device. (For example, the phone may communicate the property by communicating a multi-network NMR.) Based on the property, the interrogation device, or another device, may estimate the location of the phone.

Typically, the interrogation device solicits the mobile phone by imitating the operation of a legitimate base station of the mobile communication network with which the phone is normally associated. In some embodiments, the interrogation device transmits a signal at a relatively high power level and/or using directional antennas, such that the transmission from the interrogation device is received by the phone at a signal strength that is stronger than that of transmission from the mobile communication network with which the phone is normally associated. In response to receiving the higher-strength signal from the interrogation device, the mobile phone associates with the interrogation device, rather than with the mobile communication network.

Interrogation devices that solicit mobile phones by imitating the operation of a legitimate base station are sometimes referred to as "IMSI catchers." Examples of IMSI catching techniques are described, for example, by Strobel in "IMSI Catcher," Jul. 13, 2007, which is incorporated herein by reference, by Asokan et al., in "Man-in-the-Middle Attacks in Tunneled Authentication protocols," the 2003 Security Protocols Workshop, Cambridge, UK, Apr. 2-4, 2003, which is incorporated herein by reference, and by Meyer and Wetzel in "On the Impact of GSM Encryption and Man-in-the-Middle Attacks on the Security of Interoperating GSM/UMTS Networks," proceedings of the 15th IEEE International Symposium on Personal, Indoor and Mobile Radio Communications, Barcelona, Spain, Sep. 5-8, 2004, pages 2876-2883, which is incorporated herein by reference.

System Description

Reference is now made to FIG. 1, which is a schematic illustration of a system 21 for estimating the location of a mobile phone 30 using an interrogation device 20, in accordance with some embodiments described herein. Reference is further made to FIG. 2, which is a flow diagram for a method 23 performed by system 21, in accordance with some embodiments described herein.

Interrogation device 20 comprises an antenna 26, a transmitter-receiver (transceiver/TCVR) 22, and a processor 24. Processor 24 exchanges communication with the phone via transceiver 22 and antenna 26.

First, at a discovery step 37, processor 24, via transceiver 22 and antenna 26, discovers base stations that are near the phone, by detecting signals from the base stations. The processor then constructs a list of identifiers (e.g., Cell IDs) of the discovered base stations, at a list-constructing step 39. In some embodiments, discovery step 37 and list-constructing step 39 are not performed; instead, the list of identifiers is provided by an operator of interrogation device 20.

Next, processor 24 solicits phone 30, at a soliciting step 40, to associate with the interrogation device, instead of with the mobile communication network with which the phone is normally associated. Subsequently, at a communicating step 42, while phone 30 is associated with the interrogation device, processor 24 communicates at least some of the identifiers from the list of identifiers to the phone. For example, FIG. 1 depicts the communication of identifiers of (i) base stations 32a, 32b, and 32c, belonging to a first mobile communication network, (ii) base stations 34a, 34b, and 34c, belonging to a second mobile communication network, and (iii) base stations 36a and 36b, belonging to a third mobile communication network. In general, the processor may communicate the respective identifiers of any number of base stations, collectively belonging to any number of networks. Typically, at least one of the base stations belongs to the mobile communication network with which the phone is normally associated.

The communication of the identifiers drives the phone to tune to at least some of the base stations, such that the phone receives respective reference signals 38 from the at least some of the base stations. For example, the phone may receive respective reference signals 38 from all of the base stations, as shown in FIG. 1. (In tuning to the base stations and receiving the reference signals, the phone generally operates as if all of the base stations belonged to the network with which the phone is normally in communication; in other words, the phone need not necessarily be specially configured for method 23.) The phone then communicates a property of at least some of the received reference signals to the processor, the property being received by the processor at a property-receiving step 44.

Typically, the communicated property of received reference signals 38 takes the form of a multi-network NMR 48 (FIG. 1), in that the property includes an indication of respective strengths of the received reference signals. Such an indication may include the absolute raw or quantized signal strengths (e.g., measured in dBm), the signal strengths measured relative to each other, and/or some other indication of the respective strengths. Since each of the signal strengths is indicative of the location of the phone with respect to a respective one of the base stations, the multi-network NMR may be used to estimate the location of the phone.

Based on the communicated property, at an estimating step 46, the processor may estimate a location of the phone. Alternatively, the estimation may be performed by another device, e.g., a server in communication with the interrogation device. As described above, the estimation may be used to track the user 28 of phone 30.

As noted above, the estimate of the phone's location may be improved by using a multi-network NMR, rather than a single-network NMR. For example, with reference to FIG. 1, it will be assumed that (i) base stations 32a, 32b, and 32c belong to the network with which phone 30 is normally associated, (ii) the reference signal from base station 32a is received by the phone at a relatively low signal strength, and (iii) N>=3, i.e., the NMR generated by the phone includes at least the top three signal strengths. A single-network NMR would thus, perforce, include the strength of the signal received from base station 32a, for lack of any other nearby in-network base stations. On the other hand, a multi-network NMR might include, instead of the strength of the signal from base station 32a, a higher signal strength from one of the nearby out-of-network base stations (e.g., base station 36b).

FIG. 1 shows a base station 34c collocated with base station 32c. (Typically, such co-located base stations use different frequency bands for communication; for example, base station 32a may operate in the 800 MHz band, while base station 34c operates in the 1900 MHz band.) In generating the multi-network NMR, the phone may utilize such collocated base stations.

In general, processor 24 may be embodied as a single processor, or a cooperatively networked or clustered set of processors. Processor 24 is typically a programmed digital computing device comprising a central processing unit (CPU), random access memory (RAM), non-volatile secondary storage, such as a hard drive or CD ROM drive, network interfaces, and/or peripheral devices. Program code, including software programs, and/or data are loaded into the RAM for execution and processing by the CPU and results are generated for display, output, transmittal, or storage, as is known in the art. The program code and/or data may be downloaded to the computer in electronic form, over a network, for example, or it may, alternatively or additionally, be provided and/or stored on non-transitory tangible media, such as magnetic, optical, or electronic memory. Such program code and/or data, when provided to the processor, produce a machine or special-purpose computer, configured to perform the tasks described herein.

Although the embodiments described herein mainly address estimating the location of a phone, the principles of the present disclosure can also be used for improving the quality of service provided by a network. For example, a particular service provider may notice that the provider's network does not satisfactorily "cover" a particular geographical area, such that, for example, a relatively large number of call attempts emanating from the geographical area are unsuccessful. In response thereto, the service provider may use apparatus and techniques described herein to evaluate how other networks (e.g., networks of competing service providers) cover the particular geographical area. For example, the service provider may drive a phone to a communicate a multi-network NMR to an interrogation device belonging to the service provider, and may use the multi-network NMR to perform the above-described evaluation. Such an evaluation may help the service provider improve the quality of service provided by the service provider's network.

It will thus be appreciated that the embodiments described above are cited by way of example, and that the present disclosure is not limited to what has been particularly shown and described hereinabove. Rather, the scope of the present disclosure includes both combinations and sub-combinations of the various features described hereinabove, as well as variations and modifications thereof which would occur to persons skilled in the art upon reading the foregoing description and which are not disclosed in the prior art. Documents incorporated by reference in the present patent application are to be considered an integral part of the application except that to the extent any terms are defined in these incorporated documents in a manner that conflicts with the definitions made explicitly or implicitly in the present specification, only the definitions in the present specification should be considered.

The invention claimed is:

1. A method for evaluating a quality of service, the method comprising:
   driving a mobile phone to receive signals from both in-network base stations and out-of-network base stations;
   receiving, in response to the driving, a multi-network network-measurement-report (NMR) from the mobile phone, the multi-network NMR comprising signal strengths of each received signal, wherein each signal strength corresponds to a quality of service provided by each base station;
   estimating, using the multi-network NMR, a location of the mobile phone; and
   comparing the quality of service provided by the in-network base stations to the quality of service provided by the out-of-network base stations at the location of the mobile phone.

2. The method for evaluating a quality of service according to claim 1, further comprising:

detecting that mobile phone has made a plurality of unsuccessful call attempts.

3. The method for evaluating a quality of service according to claim 1, wherein the in-network base stations are part of a network provided by a service provider to cover the location and the out-of-network base stations are part of a network provided by a competing service provider to cover the location.

4. The method for evaluating a quality of service according to claim 1, further comprising:
improving, based on the comparison, the quality of service provided by the in-network base stations at the location, wherein the improvement is relative to a previously measured quality of service provided by the in-network base stations at the location.

5. The method for evaluating a quality of service according to claim 1, wherein the estimating a location of the mobile phone comprises:
mapping the signal strengths in the multi-network NMR to a coordinate by applying a computational model or by utilizing data obtained from drive testing.

6. The method for evaluating a quality of service according to claim 1, wherein the driving a mobile phone to receive signals from both in-network base stations and out-of-network base stations comprises:
communicating identifiers of in-network base stations and identifiers of out-of-network base stations to the mobile phone in order to drive the mobile phone to tune to each of the in-network and out-of-network base stations and receive a reference signal from each of the in-network and out-of-network base stations.

7. An interrogation device, comprising:
an antenna;
a transceiver; and
a processor, wherein the processor is configured by program code to, via the transceiver and the antenna:
drive a mobile phone to receive signals from both in-network base stations and out-of-network base stations;
receive, in response to the driving, a multi-network network-measurement-report (NMR) from the mobile phone, the multi-network NMR comprising signal strengths of each received signal, wherein each signal strength corresponds to a quality of service provided by each base station;
estimate, using the multi-network NMR, a location of the mobile phone; and
compare the quality of service provided by the in-network base stations to the quality of service provided by the out-of-network base stations at the location of the mobile phone.

8. The interrogation device according to claim 7, wherein the processor is further configured by program code to, via the transceiver and the antenna:
detect that mobile phone has made a plurality of unsuccessful call attempts.

9. The interrogation device according to claim 7, wherein the in-network base stations are part of a network provided by a service provider to cover the location and the out-of-network base stations are part of a network provided by a competing service provider to cover the location.

10. The interrogation device according to claim 7, wherein the wherein the processor is further configured by program code to:

estimate the location of the mobile phone by mapping the signal strengths in the multi-network NMR to a coordinate by applying a computational model or by utilizing data obtained from drive testing.

11. The interrogation device according to claim 7, wherein the wherein the processor is further configured by program code to:
drive a mobile phone to receive signals from both in-network base stations and out-of-network base stations by communicating identifiers of in-network base stations and identifiers of out-of-network base stations to the mobile phone in order to drive the mobile phone to tune to each of the in-network and out-of-network base stations and receive a reference signal from each of the in-network and out-of-network base stations.

12. A non-transitory computer-readable medium storing program instructions that when executed by a processor of an interrogation device cause the interrogation device to:
drive a mobile phone to receive signals from both in-network base stations and out-of-network base stations;
receive, in response to the driving, a multi-network network-measurement-report (NMR) from the mobile phone, the multi-network NMR comprising signal strengths of each received signal, wherein each signal strength corresponds to a quality of service provided by each base station;
estimate, using the multi-network NMR, a location of the mobile phone; and
compare the quality of service provided by the in-network base stations to the quality of service provided by the out-of-network base stations at the location of the mobile phone.

13. The non-transitory computer-readable medium according to claim 12, further storing program instructions that when executed by a processor of an interrogation device cause the interrogation device to:
detect that mobile phone has made a plurality of unsuccessful call attempts.

14. The non-transitory computer-readable medium according to claim 12, wherein the in-network base stations are part of a network provided by a service provider to cover the location and the out-of-network base stations are part of a network provided by a competing service provider to cover the location.

15. The non-transitory computer-readable medium according to claim 12, further storing program instructions that when executed by a processor of an interrogation device cause the interrogation device to:
estimate the location of the mobile phone by mapping the signal strengths in the multi-network NMR to a coordinate by applying a computational model or by utilizing data obtained from drive testing.

16. The non-transitory computer-readable medium according to claim 12, further storing program instructions that when executed by a processor of an interrogation device cause the interrogation device to:
drive a mobile phone to receive signals from both in-network base stations and out-of-network base stations by communicating identifiers of in-network base stations and identifiers of out-of-network base stations to the mobile phone in order to drive the mobile phone to tune to each of the in-network and out-of-network base stations and receive a reference signal from each of the in-network and out-of-network base stations.

* * * * *